(12) United States Patent
Fields et al.

(10) Patent No.: US 11,336,882 B2
(45) Date of Patent: May 17, 2022

(54) SYNCHRONIZING AN ILLUMINATION SEQUENCE OF ILLUMINATION SOURCES WITH IMAGE CAPTURE IN ROLLING SHUTTER MODE

(71) Applicant: Advanced New Technologies Co., Ltd., George Town (KY)

(72) Inventors: Zikomo Fields, Lake Lotawana, MO (US); Srikanth Parupati, Malden, MA (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/797,954

(22) Filed: Feb. 21, 2020

(65) Prior Publication Data

US 2020/0314412 A1 Oct. 1, 2020

Related U.S. Application Data

(63) Continuation of application No. 16/370,467, filed on Mar. 29, 2019.

(51) Int. Cl.
*H04N 5/235* (2006.01)
*H04N 13/254* (2018.01)
(Continued)

(52) U.S. Cl.
CPC ......... *H04N 13/254* (2018.05); *G06V 40/166* (2022.01); *G06V 40/172* (2022.01); *G06V 40/45* (2022.01); *H04N 5/2353* (2013.01)

(58) Field of Classification Search
CPC .. H04N 13/261; H04N 13/254; H04N 5/2353; H04N 5/3452; H04N 5/3532;
(Continued)

(56) References Cited

U.S. PATENT DOCUMENTS 10,281,408 B2 * 5/2019 Konno ............... G01N 21/8806
10,303,963 B1 5/2019 Edwards et al.
(Continued)

FOREIGN PATENT DOCUMENTS

| CN | 103155572 | 6/2013 |
|---|---|---|
| CN | 107111750 | 8/2017 |

(Continued)

*Primary Examiner* — Paulos M Natnael
(74) *Attorney, Agent, or Firm* — Fish & Richardson P.C.

(57) ABSTRACT

Methods, systems, and apparatus, including computer programs encoded on a computer storage medium, for a biometric authentication system. In one aspect, a method includes receiving, at one or more processing devices, data corresponding to a first set of pixels of an image sensor. The first set of pixels are exposed under illumination by a first source. Data corresponding to a second set of pixels of the image sensor is received, at the one or more processing devices. The second set of pixels are exposed under illumination by a second source that is spatially separated from the first source. A three-dimensional image is generated using the data corresponding to the first set of pixels as a first image of a pair of photometric stereo images, and the data corresponding to the second set of pixels as a second image of the pair of photometric stereo images.

17 Claims, 7 Drawing Sheets

(51) Int. Cl.
*G06V 40/40* (2022.01)
*G06V 40/16* (2022.01)

(58) Field of Classification Search
CPC ........ H04N 5/2354; H04N 5/04; G01S 17/89;
G01S 17/894; G02B 2027/0138; G06K
9/00255; G06K 9/00288; G06K 9/00906;
G06K 9/00899; G06K 9/00201; G06K
9/2018; G06K 9/2027; H04L 63/0861
See application file for complete search history.

(56) References Cited

U.S. PATENT DOCUMENTS

| | | | |
|---|---|---|---|
| 10,346,675 B1 | 7/2019 | Nagalla | |
| 10,687,034 B1* | 6/2020 | Berkovich | G01J 1/0437 |
| 2003/0227550 A1 | 12/2003 | Manico et al. | |
| 2005/0195292 A1 | 9/2005 | McIntyre et al. | |
| 2009/0201377 A1 | 8/2009 | Okano | |
| 2010/0253788 A1* | 10/2010 | Okano | H04L 63/083 348/207.1 |
| 2011/0181873 A1* | 7/2011 | Yavets-Chen | G01N 21/8901 356/237.2 |
| 2011/0292179 A1* | 12/2011 | Hernandez | G01B 11/2545 348/46 |
| 2012/0084652 A1* | 4/2012 | Martinez Bauza | H04N 13/167 715/719 |
| 2013/0010057 A1* | 1/2013 | Borel | H04N 13/128 348/42 |
| 2013/0057646 A1* | 3/2013 | Chen | H04N 19/174 348/43 |
| 2013/0265426 A1* | 10/2013 | Fan | G07B 15/02 348/148 |
| 2014/0002509 A1* | 1/2014 | Kim | G09G 3/3659 345/690 |
| 2014/0044321 A1 | 2/2014 | Derakhshani et al. | |
| 2015/0109416 A1* | 4/2015 | Gallup | H04N 13/271 348/46 |
| 2015/0172628 A1* | 6/2015 | Brown | G06T 17/05 348/47 |
| 2015/0282046 A1* | 10/2015 | Shin | H04W 40/246 455/434 |
| 2015/0348313 A1 | 12/2015 | Fuchikami et al. | |
| 2016/0076942 A1* | 3/2016 | Zawaideh | A61B 5/0075 356/364 |
| 2016/0156842 A1 | 6/2016 | Baldwin | |
| 2016/0163057 A1* | 6/2016 | Rowley | G06T 7/586 348/46 |
| 2016/0261860 A1* | 9/2016 | Gu | H04N 17/04 |
| 2016/0295202 A1* | 10/2016 | Evans | G02B 27/017 |
| 2017/0191946 A1* | 7/2017 | Smith | G06T 7/0002 |
| 2018/0239955 A1 | 8/2018 | Rodriguez et al. | |
| 2018/0270465 A1* | 9/2018 | Bendall | G01N 21/8851 |
| 2019/0034720 A1 | 1/2019 | He et al. | |
| 2019/0044723 A1 | 2/2019 | Prakash et al. | |
| 2019/0147156 A1 | 5/2019 | Burri et al. | |
| 2019/0303551 A1 | 10/2019 | Tussy | |
| 2020/0128166 A1 | 4/2020 | Fukumoto | |
| 2020/0249428 A1 | 8/2020 | Sugiyama | |

FOREIGN PATENT DOCUMENTS

| | | |
|---|---|---|
| CN | 108369785 | 8/2018 |
| WO | WO2017076292 | 5/2017 |

* cited by examiner

SYNCHRONIZING AN ILLUMINATION SEQUENCE OF ILLUMINATION SOURCES WITH IMAGE CAPTURE IN ROLLING SHUTTER MODE

PRIORITY CLAIM

This application claims priority to U.S. application Ser. No. 16/370,467, filed on Mar. 29, 2019, the entire contents of which is incorporated herein by reference.

TECHNICAL FIELD

This specification generally relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

Implementations of the present disclosure are generally directed to image capture devices employed within a biometric authentication system. More specifically, implementations are directed to capturing images of a subject in a rolling shutter mode, where the illuminations of spatially separated illumination sources are synchronized with the rolling shutter through an illumination sequence. The captured images can be used to generate a three dimensional (3D) image of the subject that can be used, for example, to authenticate the subject.

In a general implementation, a method includes receiving, at one or more processing devices, data corresponding to a first set of pixels of an image sensor. The first set of pixels are exposed under illumination by a first source. Data corresponding to a second set of pixels of the image sensor is received, at the one or more processing devices. The second set of pixels are exposed under illumination by a second source that is spatially separated from the first source. A three-dimensional image is generated using the data corresponding to the first set of pixels as a first image of a pair of photometric stereo images, and the data corresponding to the second set of pixels as a second image of the pair of photometric stereo images.

Particular implementations of the subject matter described in this disclosure can be implemented so as to realize one or more of the following advantages. By synchronizing alternate activation of at least two spatially separated illumination sources with a rolling shutter camera, separate images corresponding to each of the illumination sources can be obtained at a frame rate that is higher than the regular frame rate for the camera. The images can be used to generate 3D representations of the subject, for example, using photometric stereo technologies. While the higher frame rate comes at a cost of a decreased resolution—because only a subset of pixels, or rows of pixels, are captured under illumination by a particular illumination source—the captured images have sufficient resolution for applications such as spoof detection (e.g., making an initial determination as to whether the subject is a live person or a spoof alternative representation of a person, such as a photo printed on paper). Employing these techniques allows for the use of low-cost shutter cameras, which may not otherwise have a frame rate desirable for generating 3D representations. Such 3D representations may in turn be used in spoof-detection, for example, by differentiating from two-dimensional (2D) images of the same subject. In some implementations, the technology may be used to determine that the subject is alive. Accordingly, reliability and/or security of biometric authentication systems can be improved by allowing the system to discriminate between live persons and alternative representations such as 2D images without using expensive and/or complex high frame-rate cameras. By allowing a biometric authentication system to discriminate between a live person and a 2D spoof alternative representation, additional processing can be pre-emptively terminated, thereby creating an additional layer of security. In some cases, the technology described herein allows for implementing a spoof detection system while reducing requirements for additional hardware. This in turn in some cases, can reduce costs associated with the underlying biometric authentication system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
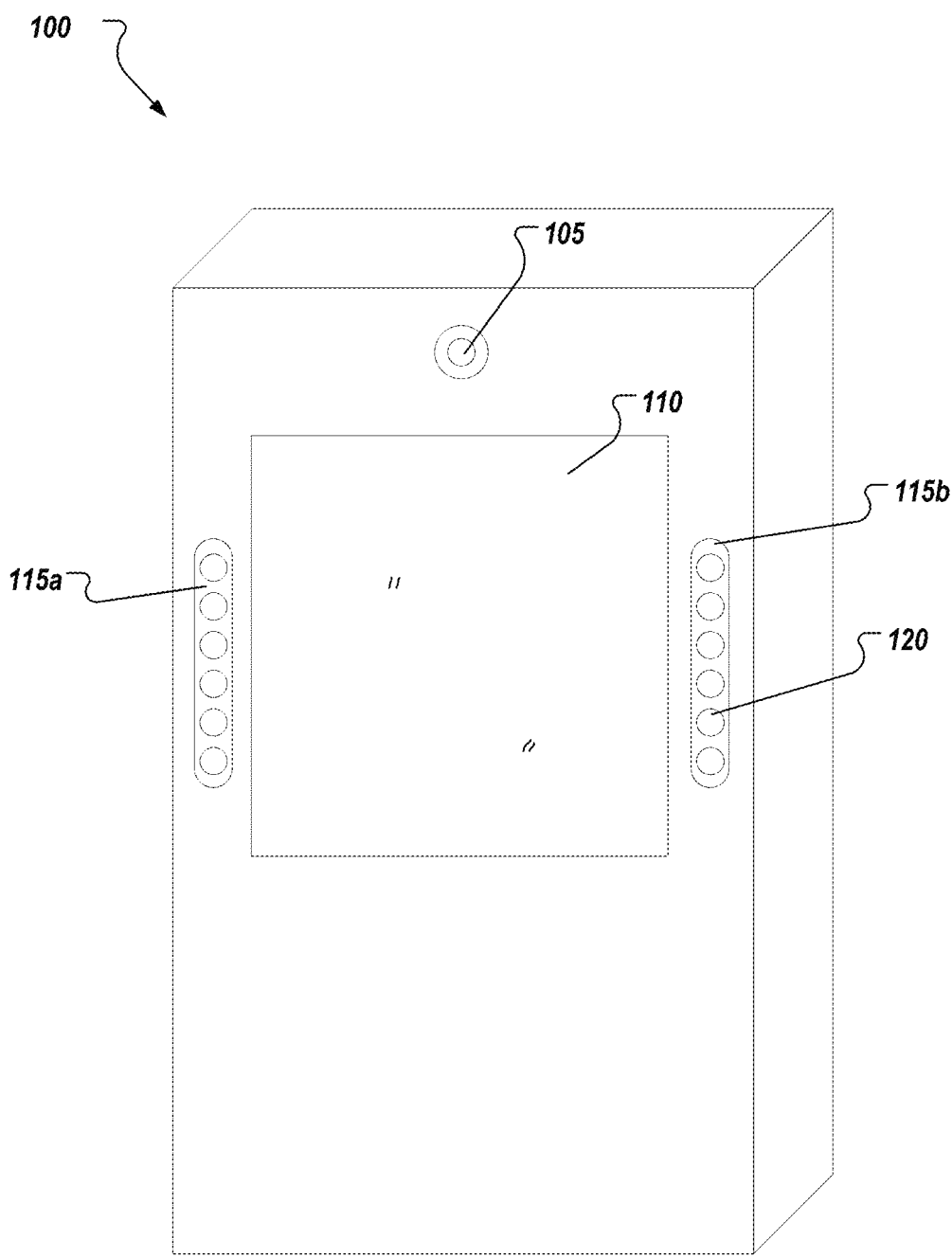
FIG. 1 depicts a kiosk machine as an example environment to which a biometric authentication system may deployed.

Implementations of the present disclosure are generally directed to capturing images of a subject using a rolling shutter that works in coordination with two or more spatially separated image sources. Activation of spatially separated illumination sources are synchronized with the rolling shutter exposing corresponding portions (e.g., different rows of pixels) of an image sensor such that multiple images—each corresponding to one of the illumination sources—can be captured by the time the rolling shutter exposes the image sensor. For example, if two spatially separated light emitting diode (LED) sources are activated alternately coordinated with alternate rows (or columns) of pixels being exposed by the rolling shutter, two separate images (each corresponding to illumination by a corresponding one of the two sources, and each having half the number of pixels as compared to the image sensor) are captured in the time the rolling shutter exposes the entire image sensor. Therefore a relatively low frame rate camera (e.g., operating at 60 Hz) can be used to capture lower resolution images at a higher frame rate (120 Hz, in the current example). Because the captured images correspond to illumination by a different, spatially separated light sources, photometric stereo techniques can be used to generate a 3D reconstruction of the subject from such images. The generated 3D images can be used for various purposes, for example, to authenticate the subject, or to detect whether the subject is a spoof alternative representation of a live human being. Services can be provided (or denied) to the subject based on the authentication.

Various biometric identification/authentication systems are based on capturing one or more images, which are then compared with or analyzed with reference to template images captured during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be authenticated.

In an example context, a biometric authentication system may be deployed in a kiosk-type device, such as an automated teller machine (ATM). The kiosk may include a camera that can be used by the biometric authentication system to capture run-time images of users. The camera component of a kiosk may include a shutter. A shutter is a device that allows light to pass for a determined period, exposing photographic film or a light-sensitive electronic sensor to light in order to capture a permanent image of a scene. A mechanical shutter uses conventional front and rear shutter curtains located in front of the sensor which open and close to produce the exposure.

A rolling shutter is a method of image capture in which a still picture (in a still camera) or each frame of a video (in a video camera) is captured by scanning across the scene, either vertically or horizontally, such that all of the parts of an image of a scene are recorded although not at exactly the same instant. During playback, however, the image of the scene can be displayed at once, as if it represents a single instant in time. A rolling shutter is in contrast with "global shutter" in which the entire frame is captured at the same instant. The rolling shutter can be engaged as a mode for a camera that captures the rows of pixels through either a mechanical or electronic means as described above.

In view of the foregoing, and as described in further detail herein, implementations of the present disclosure provide for a biometric authentication system, which can be deployed within a kiosk. In some implementations, the subject is illuminated with an illumination sequence that controls the light radiated from two or more spatially-separated illuminators/light sources. The illumination sequence synchronizes the light sources with the rolling shutter as the rows of pixels are collected for an image (e.g., the lights fire according to the sequence as the shutter moves across the aperture/sensor exposing each row of pixels). For example, an illumination sequence may fire: 1) a first light source for a first row while the second light source is off, the second light source for a second row while the first light source is off, 3) the first light source for a third row while the second is off, 4) the second light source for a fourth row while the first is off, and so forth.

When used in subsequent biometric processing, use of captured images can improve the accuracy and/or efficiency of underlying biometric authentication technologies. For example, captured images may be used to generate a three-dimensional (3D) representation of the subject using photometric stereo reconstruction techniques. Photometric stereo reconstruction techniques include analysis of multiple images of an object under different lighting conditions to estimate a normal direction at each pixel. Such techniques can be employed in, for example, computer vision for estimating surface normals of objects by observing the object under different lighting conditions. Employing these techniques allows for the use of shutter cameras, which are typically lower cost, to be used to generate 3D representations. Such 3D representations may in turn be used in spoof detection, for example, by differentiating from two-dimensional (2D) images of the same subject.

FIG. 1 depicts a kiosk machine 100 as an example environment to which a biometric authentication system may deployed. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include a camera 105 and at least two illumination sources 115a and 115b (115, in general). The illumination sources 115 may be spatially separated from one another, and are configured to generate electromagnetic radiation at multiple wavelengths. For example, the illumination sources 115 can each include one or more light emitting diode (LED) elements 120 that may be controlled to generate electromagnetic radiation patterns or sequences at different wavelength ranges. The wavelength ranges can include the visible spectrum of about 400-700 nm, the NIR spectrum of about 700-1400 nm, and/or wavelengths in the 320-400 nm range. While the example in FIG. 1 shows only two illumination sources 115 that are physically separated along a horizontal direction, various other configurations are also possible. For example, the illumination sources 115 may be separated along a vertical direction, and/or more than two illumination sources may be used.

The camera 105 can be employed to capture images of, for example, users interacting with the kiosk 100. As described above, the camera may operate at lower frame rates by employing a rolling shutter that is synchronized with the spatially separated illumination sources 115 according to an illumination sequence. This allows users to be sampled in higher frequency bands as the shutter progresses across the camera sensor/aperture. In some implementations, the rolling shutter camera line scan frequency is synchronized with the illumination sequence by employing, for example, the camera's general-purpose input/output (GPIO), which signals when the exposure begins. An example illumination sequence may illuminate alternative rows of pixels respectively with each illumination sources 115. In such an example, the alternative rows of pixels may be employed by the biometric authentication system to generate two separate images, which are illuminated by two separate light sources (illumination sources 115a and 115b). These two images may be used to generate, for example, a 3D image of the subject (e.g., the user). In some implementations, the spatially separated illumination sources 115 can be configured to radiate electromagnetic radiations according to the illumination sequence such that at a given time, the illumination source 115a radiates illumination at a wavelength range that is at least partially non-overlapping with the wavelength range radiated from the illumination source 115b.

Each image captured by the camera 105, where pixel capture is synchronized with the illumination sources 115 according to an illumination sequence, thus has an identifiable illumination pattern. For example, an image may include an image pattern that includes rows of pixels where the subject was illuminated with illumination source 115a while illumination source 115b was off and vice versa according to an illumination sequence.

In some examples, the captured image(s) can be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

In some implementations, the images captured using the camera 105 can be processed by the biometric authentication system to identify/authenticate the user. In some implementations, the biometric authentication system may extract from the images, various features, such as features derived from the face, iris, vasculature underlying the sclera of the eye, or the periocular region, and so forth, to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine-learning process may be implemented, at least in part, using one or more processing devices deployed on the kiosk 100. In some implementations, the kiosk 100 may communicate with one or more remote processing devices (e.g., one or more remote servers) that implement the machine learning process (see FIG. 2).

In some implementations, the content of the images captured using the camera 105 may govern, at least in part, the accuracy and/or efficiency of the underlying biometric authentication system. However, in some cases, it may not be feasible to deploy high-quality and expensive cameras in the kiosks. The technology described herein allows for capturing images according to an illumination sequence, and processing the images to generate a 3D representation of a subject. This, in some cases, may allow for implementing an accurate and efficient biometric authentication system even with relatively inexpensive and low-quality cameras.

Figure 2:
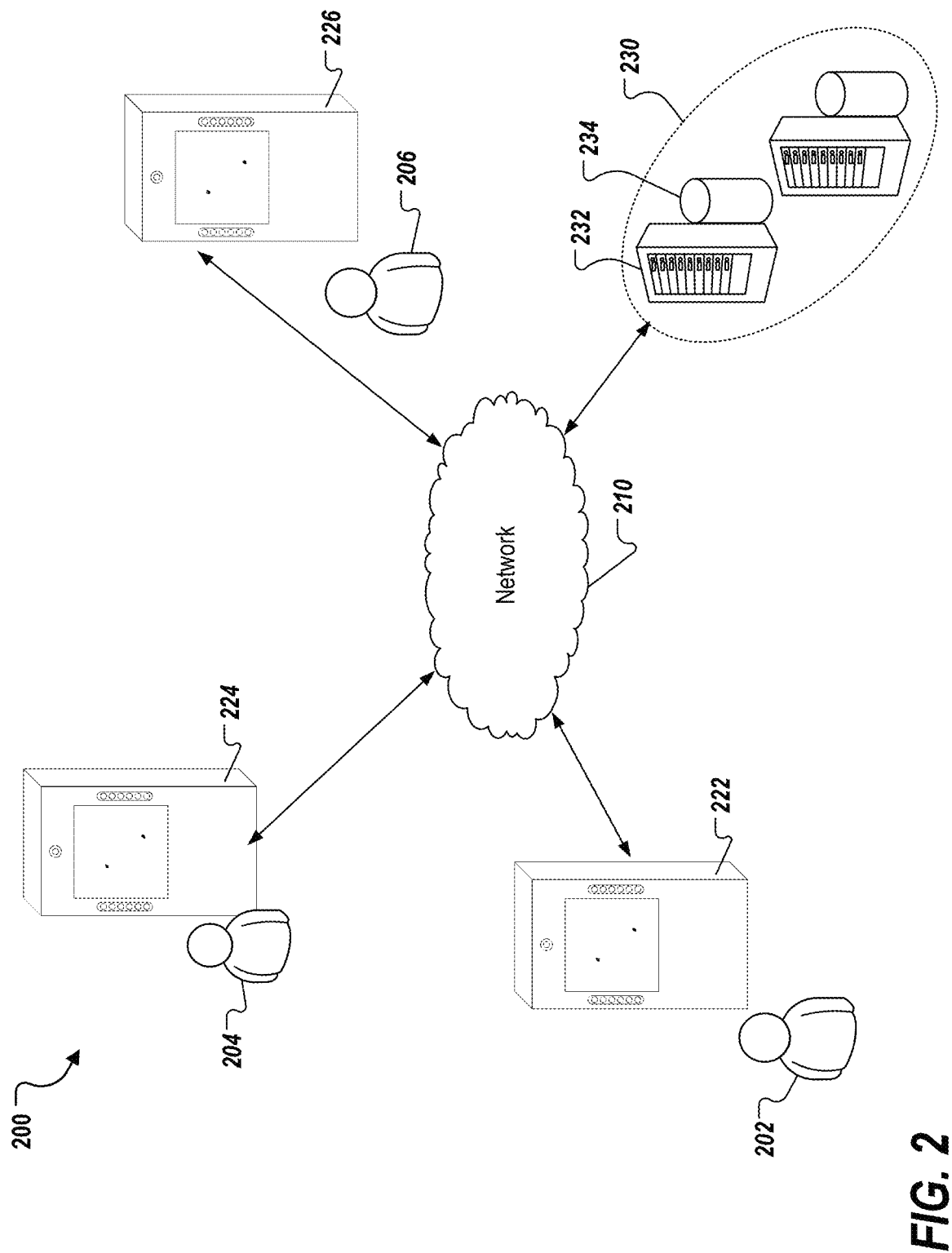
FIG. 2 depicts an example environment that can be employed to multi instances of a biometric authentication system.

FIG. 2 depicts an example environment 200 that can be employed to execute and/or coordinate multi instances of the described biometric authentication system. The example environment 200 includes network 210, a back-end system 230, and kiosk devices 222-226. The kiosk devices 222-226 are substantially similar to the kiosk device 100 of FIG. 1.

In some implementations, the network 210 includes a local area network (LAN), wide area network (WAN), the Internet, or a combination thereof, and connects computing devices (e.g., the kiosk devices 222-226) and back-end systems (e.g., the back-end system 230). In some implementations, the network 210 can be accessed over a wired and/or a wireless communications link.

In the depicted example, the back-end system 230 includes at least one server system 232 and a data store 234. In some implementations, the back-end system 230 provides access to one or more computer-implemented services with which the kiosks 222-236 may interact. The computer-implemented services may be hosted on, for example, the at least one server system 232 and the data store 234. The computer-implemented services may include, for example, an authentication service that may be used by the kiosks 222-236 to authenticate a user based on collected image data.

In some implementations, the back-end system 230 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 230 is deployed and provides computer-implemented services through a virtual machine(s).

Figure 3:
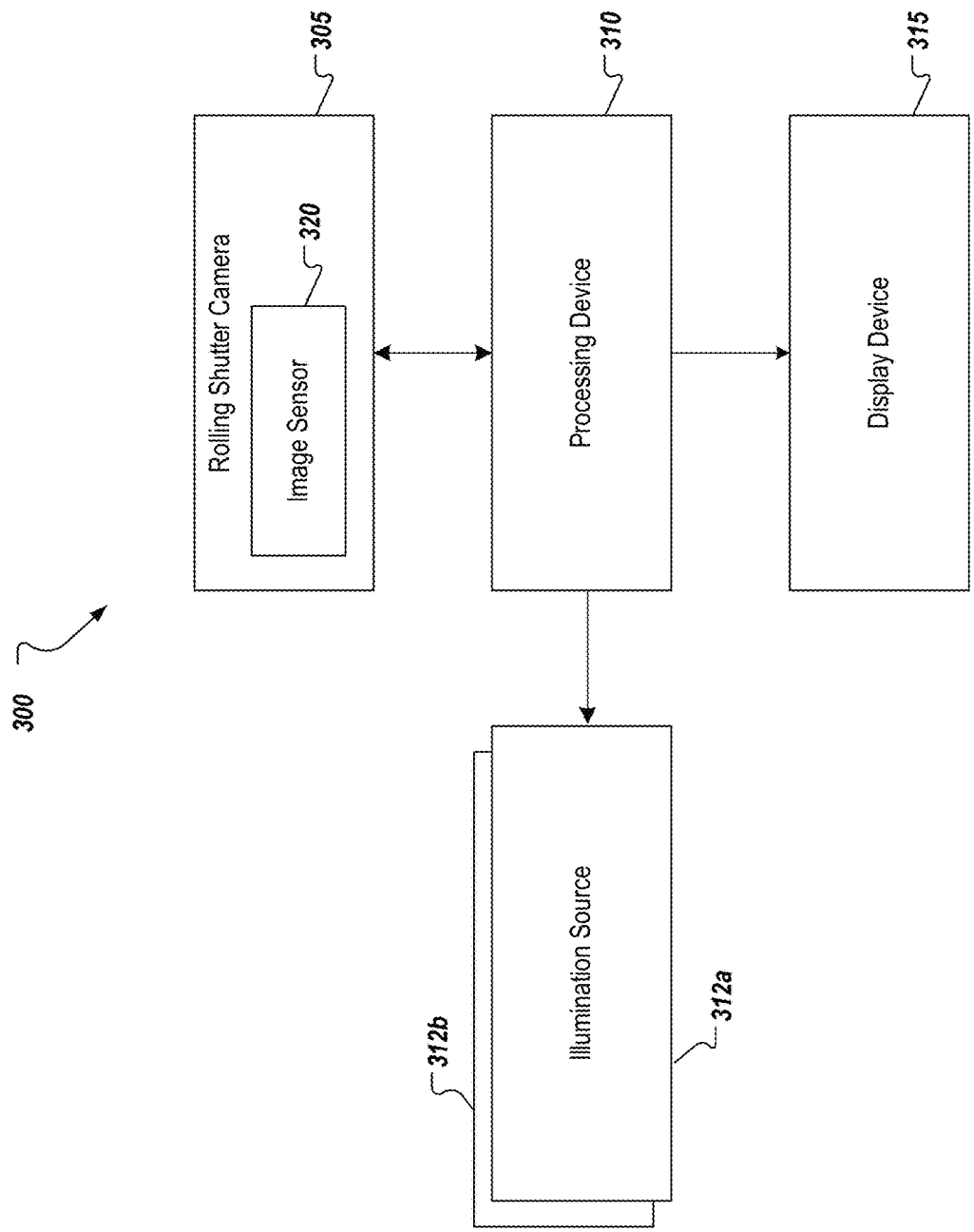
FIG. 3 depicts a system that can be used to implement the technology described herein.

FIG. 3 depicts a system 300 that can be used to implement the technology described herein. The system 300 includes a rolling shutter camera 305, a processing device 310, illumination sources 312a and 312b (generally, illumination sources 312), and a display device 315. In come implementations, the system 300 may be included within a kiosk, such as described with reference to FIG. 1. For example, the display device 315 can be the display device 110, the illumination sources 312 can be the illumination sources 115, and the rolling shutter camera 305 can be the camera 105. In some implementations, the display device 315 can be disposed on a mobile device, such as a smartphone, tablet computer, or an e-reader. The rolling shutter camera 305 includes an image sensor 320. The image sensor 320 detects and conveys the information that constitutes an image (e.g., the pixels collected through the rolling shutter as described above). Types of image sensors include, for example, complementary metal—oxide—semiconductor (CMOS) and charge-coupled devices (CCD). The illumination sources 312a and 312b can be spatially separated from one another. The one or more processing devices 310 can synchronize the illuminations of the spatially separated illumination sources 312a and 312b with the rolling shutter camera 305 using an illumination sequence.

Outputs from the image sensor 320 can be processed using one or more processing devices 310. In some implementations, the output of the one or more processing devices 310 may be used to drive a display device 315. The one or more processing devices 310 can be configured to process the outputs from the image sensor 320 in various ways. In some implementations, the one or more processing devices 310 are configured to implement a photometric stereo reconstruction process to generate a 3D representation of the subject. This can include, for example, estimating the surface normals of the subject in the two or images that are captured under different lighting conditions, as described above. Because the amount of light reflected by a surface is dependent on the orientation of the surface in relation to the light source and the observer, possible surface orientations can be estimated from one image obtained under a particular illumination condition. From the two or more images obtained under different lighting conditions (e.g., from the rows of pixels illuminated by a particular source), the true orientation of a surface may be accurately estimated. In some cases, this is referred to as a shape-from-shading technique, and can be used to estimate a 3D representation of the subject captured using the different image sensor 305 according to an illumination sequence.

Figure 4A:
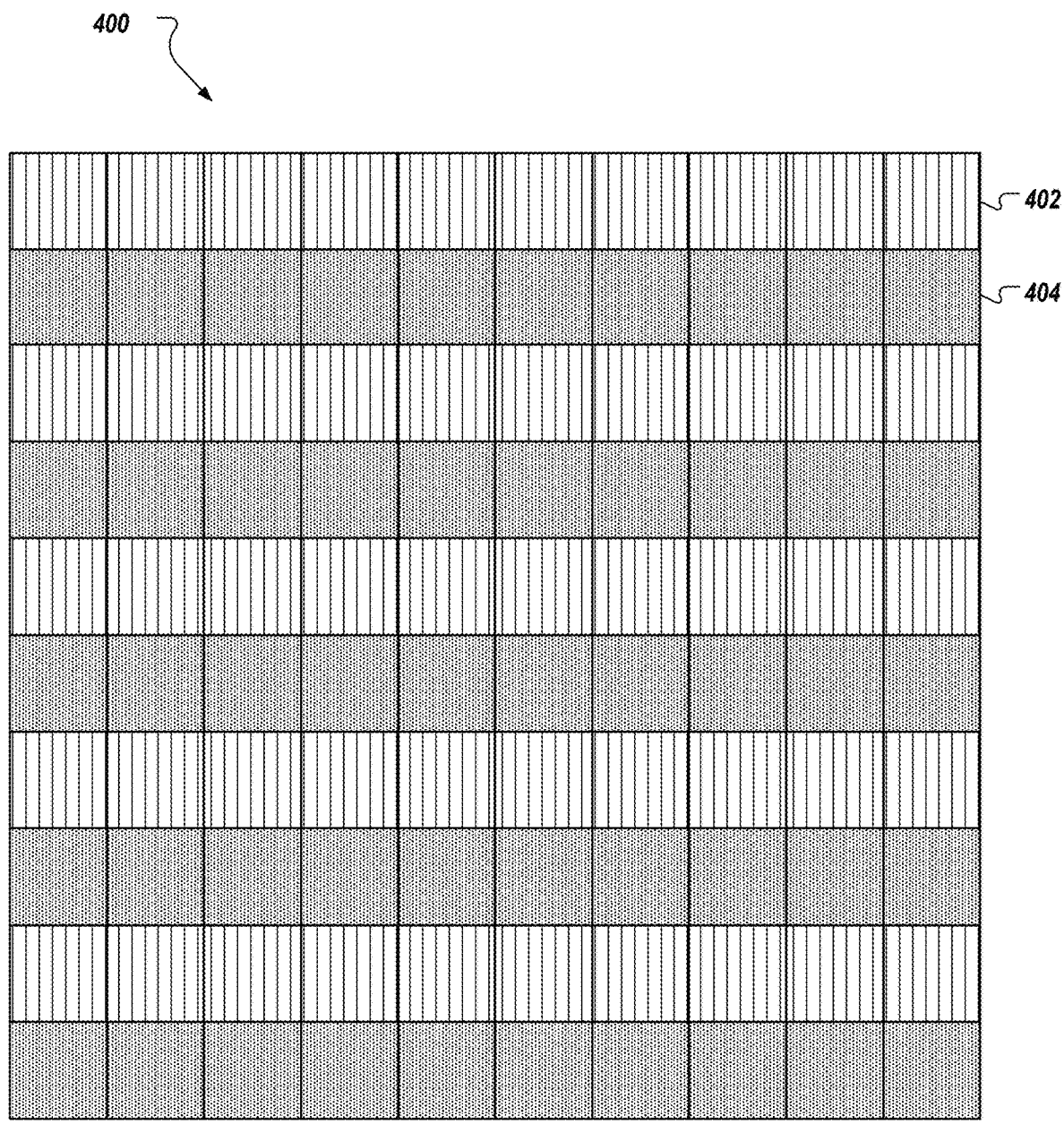
FIGS. 4A-4C are conceptual diagrams that depict example image-capture schemes that use two spatially-separated light sources that can be employed within a biometric authentication system.
Figure 4B:
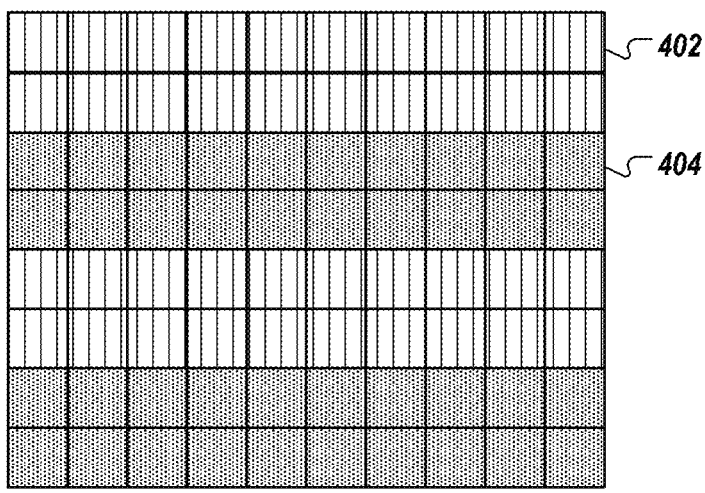
Figure 4C:
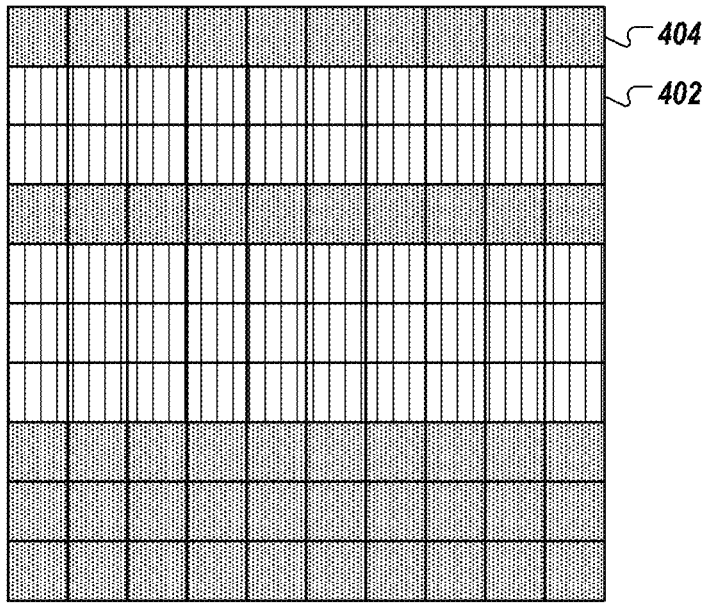

FIGS. 4A-4C are conceptual diagrams that depict example image-capture schemes 400, 420, and 440, respectively, that use two spatially-separated light sources and that can be employed within the described biometric authentication system. The image-capture schemes 400, 420, and 440 are depicted as 10×10 grids where each square represent a pixel. The image-capture schemes 400, 420, and 440 are illustrated with striped rows of pixels (e.g., a row 402) and shaded rows of pixels (e.g., a row 404). The striped pixel rows 402 and the shaded pixel rows 404 each represent rows of pixels captured by a camera in rolling shutter mode, where the striped pixel rows 402 are exposed under illumination by a first source, and the shaded pixel rows 404 are exposed under illumination by a second source.

For instance, with the image-capture scheme 400, odd-numbered rows (e.g., the striped pixel rows 402) can be captured under illumination by a first source and even numbered rows (e.g., the shaded pixel rows 404) can be captured under illumination by a second source, such that two images (e.g., with five rows of pixels in each, in this example) are captured using a ten-row image sensor. As another example, with the image-capture scheme 420, the illumination sequence includes activating the first source while the rolling shutter exposes the first two striped pixel rows 402, then activating the second source while the rolling shutter exposes the third and fourth shaded pixel rows 404, and then repeating the activation pattern as the rolling shutter traverses the entire sensor. The sources can be activated in accordance with other schemes that are synchronized with the rolling shutter traversing various portions of the image sensor. FIG. 4C illustrates a general scheme where the number of rows that are exposed under illumination by a particular source are varied as the rolling shutter traverses across the image sensor.

In some implementations, illumination settings associated with the sources are synchronized with the rolling shutter (e.g., during pixel capture) according to an illumination sequence as described above. The striped rows of pixels 402 and the shaded rows of pixels 404 are linear groupings of pixels that may be oriented horizontally (i.e., row-wise, as depicted) or vertically (i.e., column-wise, not shown, depending on how the rolling shutter traverses over the image sensor).

As an example, a first illumination setting may include a first illumination source providing illumination while a second illumination source is off and the second illumination setting may include the second illumination source providing illumination while the first illumination source is off. As another example, the first illumination setting may include a first illumination source and a second illumination source providing illumination at respective first wavelengths and the second illumination setting may include the first illumination source and the second illumination source providing illumination at respective second wavelengths.

The size of the grid used to depict the image-capture schemes 400, 420, and 440 is to provide a simple representation of a grid of pixel. Images captured by a camera, such as camera 150, in a rolling shutter mode typically include much larger grids of pixels. Image-capture schemes 400, 420, and 440 are provided as examples, other patterns can be generated and employed within the described biometric authentication system.

Figure 5:
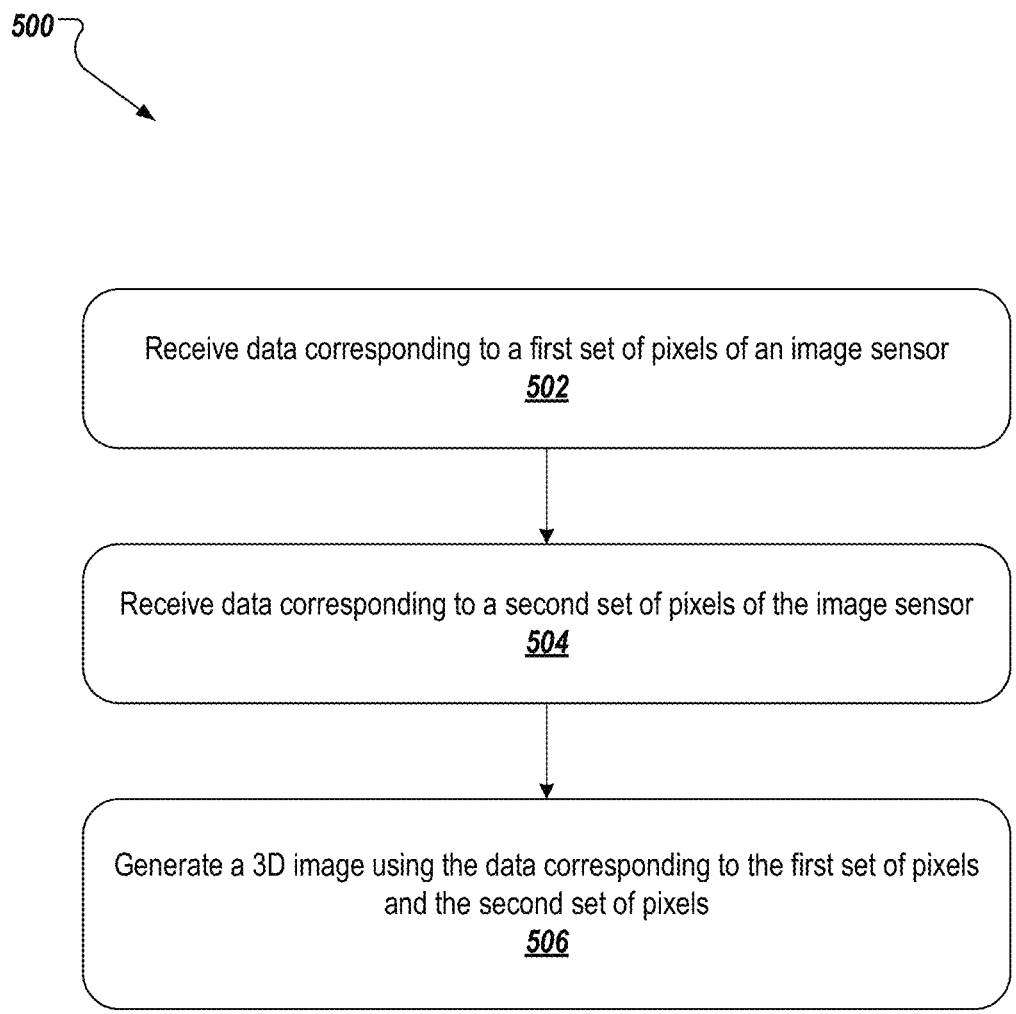
FIG. 5 is a flowchart of an example process employed within a biometric authentication system.

FIG. 5 depicts a flow diagram of an example process 500 employed within a biometric authentication system deployed on, for example, a kiosk device, such as kiosk 100 of FIG. 1. In some implementations, at least a portion of the process can be executed at the one or more processing devices 310 described above with reference to FIG. 3. At 502, data corresponding to a first set of pixels of an image sensor is received. The first set of pixels are exposed under illumination by a first source At 504, data corresponding to a second set of pixels of the image sensor is received. The second set of pixels are exposed under illumination by a second source that is spatially separated from the first source. In some implementations, the first and second sets of pixels are partially non-overlapping. In some implementations, exposure of the image sensor is controlled by a rolling shutter that exposes the pixels of the image sensor in a row-wise manner. In some implementations, exposure of the image sensor is controlled by a rolling shutter that exposes the pixels of the image sensor in a column-wise manner. In some implementations, the first source is activated at a higher intensity than the second source at the time of exposure of the first set of pixels. In some implementations, the second source is activated at a higher intensity than the first source at the time of exposure of the first set of pixels. In some implementations, the first source is activated at a different wavelength than the second source at the time of exposure of the first set of pixels.

At 506, a 3D image is generated using the data corresponding to the first set of pixels as a first image of a pair of photometric stereo images, and the data corresponding to the second set of pixels as a second image of the pair of photometric stereo images. The 3D image can be generated using photometric stereo reconstruction techniques. In some implementations, the 3D image depicts a user and the user is authenticated based on comparing the 3D image of the user to a template image of the user. In some implementations, the template image of the user was captured during an enrollment process. In some implementations, information is displayed to the user on a display based on the authentication. In some implementations, a determination is made that the 3D image corresponds to an alternative representation of a live person, and responsive to identifying the subject in the image to be an alternative representation of a live person, access to a secure system is prevented. From 506, the process 500 ends.

Figure 6:
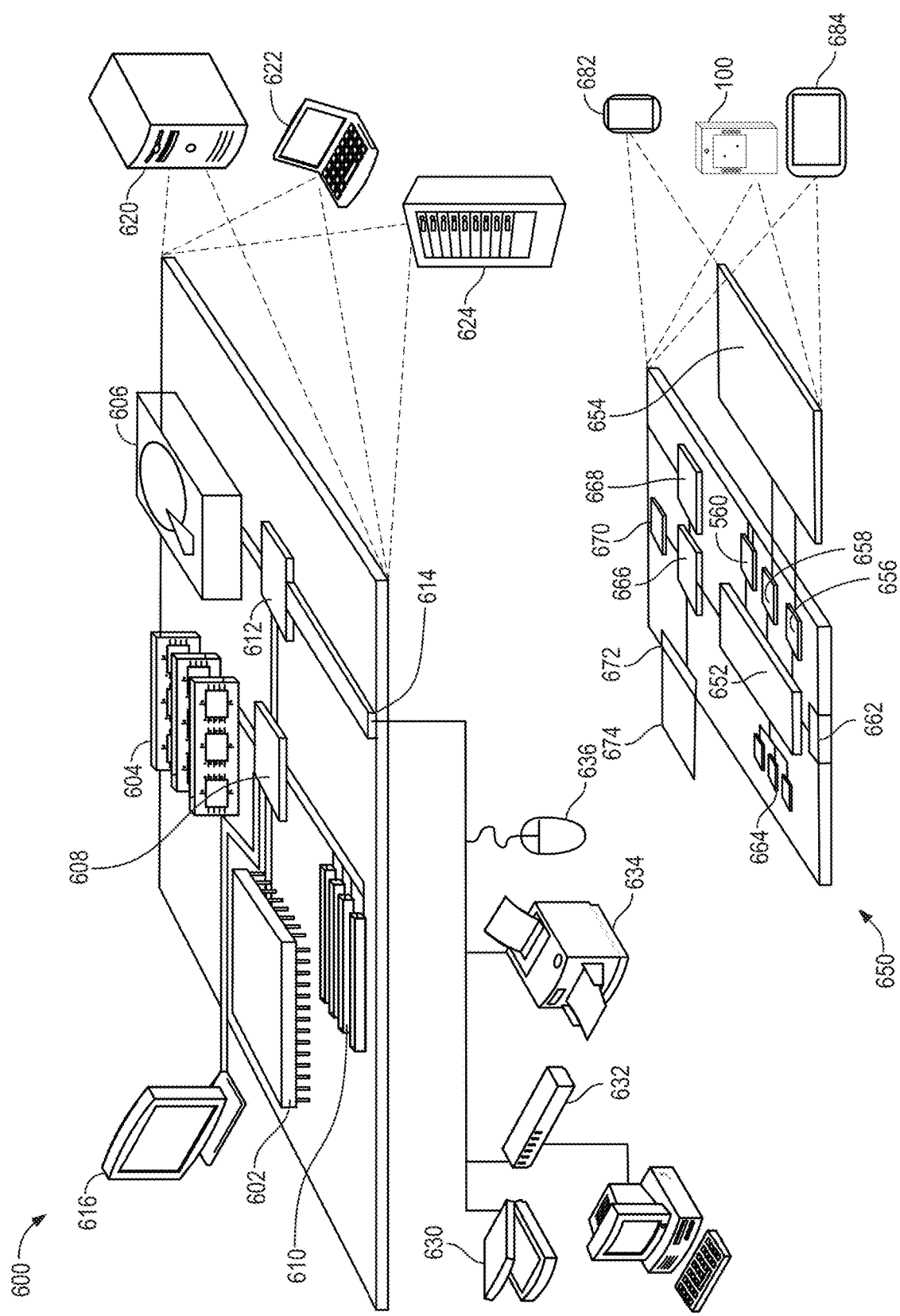
FIG. 6 is a block diagram representing examples of computing devices.

FIG. 6 shows an example of a computing device 600 and a mobile computing device 650 that are employed to execute implementations of the present disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 600 includes a processor 602, a memory 604, a storage device 606, a high-speed interface 608, and a low-speed interface 612. In some implementations, the high-speed interface 608 connects to the memory 604 and multiple high-speed expansion ports 610. In some implementations, the low-speed interface 612 connects to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 and/or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of a computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 602, perform one or more methods, such as those described above. The instructions can also be stored by one or more storage devices, such as computer-readable or machine-readable mediums, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., Universal Serial Bus (USB), Bluetooth, Ethernet, wireless Ethernet) may be coupled to one or more input/output devices. Such input/output devices may include a scanner 630, a printing device 634, or a keyboard or mouse 636. The input/output devices may also be coupled to the low-speed expansion port 614 through a network adapter. Such network input/output devices may include, for example, a switch or router 632.

The computing device 600 may be implemented in a number of different forms, as shown in the FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652; a memory 664; an input/output device, such as a display 654; a communication interface 666; and a transceiver 668; among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate. In some implementations, the mobile computing device 650 may include a camera device(s) (not shown).

The processor 652 can execute instructions within the mobile computing device 650, including instructions stored in the memory 664. The processor 652 may be implemented as a chipset of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC) processor. The processor 652 may provide, for example, for coordination of the other components of the mobile computing device 650, such as control of user interfaces (UIs), applications run by the mobile computing device 650, and/or wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display, an Organic Light Emitting Diode (OLED) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 652, perform one or more methods, such as those described above. The instructions can also be stored by one or more storage devices, such as one or more computer-readable or machine-readable mediums, such as the memory 664, the expansion memory 674, or memory on the processor 652. In some implementations, the instructions can be received in a propagated signal, such as, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), Multimedia Messaging Service (MIMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 668 using a radio frequency. In addition, short-range communication, such as using a Bluetooth or Wi-Fi, may occur. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in FIG. 6. For example, it may be implemented the kiosk 100 described in FIG. 1. Other implementations may include a mobile device 682 and a tablet device 684. The mobile computing device 650 may also be implemented as a component of a smartphone, personal digital assistant, AR device, or other similar mobile device.

Computing device 600 and/or 650 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for generating a three-dimensional (3D) image, the method comprising:
receiving, at one or more processing devices, data corresponding to a first set of pixels of an image sensor of a camera that are exposed by a rolling shutter of the camera under illumination by a first source;
receiving, at the one or more processing devices, data corresponding to a second set of pixels of the image sensor of the camera that are exposed by the rolling shutter of the camera under illumination by a second source,
wherein the first set of pixels is at least partially distinct from the second set of pixels, and wherein the first set of pixels is exposed at least partially at different times compared to the second set of pixels;
generating the 3D image using the data corresponding to the first set of pixels as a first image of a pair of stereo images, and the data corresponding to the second set of pixels as a second image of the pair of stereo images;
determining that a subject in the 3D image corresponds to an alternative representation of a live person; and
responsive to determining that the subject in the 3D image corresponds to the alternative representation of a live person, preventing access to a secure system.

2. The computer-implemented method of claim 1, wherein the rolling shutter exposes the first and second sets of pixels in a row-wise manner.

3. The computer-implemented method of claim 1, wherein the rolling shutter exposes the first and second sets of pixels in a column-wise manner.

4. The computer-implemented method of claim 1, wherein the first source is activated at a higher intensity than the second source at a time of exposure of the first set of pixels.

5. The computer-implemented method of claim 1, wherein the second source is activated at a higher intensity than the first source at a time of exposure of the first set of pixels.

6. The computer-implemented method of claim 1, wherein the first source is activated at a different wavelength than the second source at a time of exposure of the first set of pixels.

7. The computer-implemented method of claim 1, wherein the first source is spatially separated from the second source.

8. The computer-implemented method of claim 1, wherein the first source and the second source each comprise one or more light emitting diodes.

9. One or more non-transitory computer-readable storage media coupled to one or more processors and having instructions stored thereon which, when executed by the one or more processors, cause the one or more processors to perform operations comprising:
receiving data corresponding to a first set of pixels of an image sensor of a camera that are exposed by a rolling shutter of the camera under illumination by a first source;
receiving data corresponding to a second set of pixels of the image sensor of the camera that are exposed by the rolling shutter of the camera under illumination by a second source,
wherein the first set of pixels is at least partially distinct from the second set of pixels, and wherein the first set of pixels is exposed at least partially at different times compared to the second set of pixels;
generating a three-dimensional (3D) image using the data corresponding to the first set of pixels as a first image of a pair of stereo images, and the data corresponding to the second set of pixels as a second image of the pair of stereo images;
determining that a subject in the 3D image corresponds to an alternative representation of a live person; and
responsive to determining that the subject in the 3D image corresponds to the alternative representation of a live person, preventing access to a secure system.

10. The computer-readable storage media of claim 9, wherein the rolling shutter exposes the first and second sets of pixels in a row-wise manner.

11. The computer-readable storage media of claim 9, wherein the rolling shutter exposes the first and second sets of pixels in a column-wise manner.

12. The computer-readable storage media of claim 9, wherein the first source is activated at a higher intensity than the second source at a time of exposure of the first set of pixels.

13. The computer-readable storage media of claim 9, wherein the second source is activated at a higher intensity than the first source at a time of exposure of the first set of pixels.

14. A system, comprising:
a rolling shutter;
a first illumination source;
a second illumination source;
a one or more processing devices configured to perform operations comprising:
receiving data corresponding to a first set of pixels of an image sensor of a camera that are exposed by the rolling shutter of the camera under illumination by the first illumination source;
receiving data corresponding to a second set of pixels of the image sensor of the camera that are exposed by the rolling shutter of the camera under illumination by the second illumination source,
wherein the first set of pixels is at least partially distinct from the second set of pixels, wherein the first set of pixels is exposed at least partially at different times compared to the second set of pixels, wherein the first set of pixels is included in a first set of rows of the image sensor, wherein the second set of pixels is included in a second set of rows of the image sensor, and wherein the first set of rows and the second set of rows are intermixed with one another; and
generating a three-dimensional (3D) image using the data corresponding to the first set of pixels as a first image of a pair of stereo images, and the data corresponding to the second set of pixels as a second image of the pair of stereo images.

15. The system of claim 14, wherein the rolling shutter exposes the first and second sets of pixels in a row-wise manner.

16. The system of claim 14, wherein the rolling shutter exposes the first and second sets of pixels in a column-wise manner.

17. The system of claim 14, wherein the first illumination source is activated at a higher intensity than the second illumination source at a time of exposure of the first set of pixels.

\* \* \* \* \*